US009199217B2

(12) United States Patent
Sinha et al.

(10) Patent No.: US 9,199,217 B2
(45) Date of Patent: Dec. 1, 2015

(54) MATERIAL FABRICATION USING ACOUSTIC RADIATION FORCES

(75) Inventors: Naveen N. Sinha, Los Alamos, NM (US); Dipen N. Sinha, Los Alamos, NM (US); Gregory Russ Goddard, Keizer, OR (US)

(73) Assignee: LOS ALAMOS NATIONAL SECURITY, LLC, Los Alamos, NM (US)

( * ) Notice: Subject to any disclaimer, the term of this patent is extended or adjusted under 35 U.S.C. 154(b) by 1203 days.

(21) Appl. No.: 13/047,684

(22) Filed: Mar. 14, 2011

(65) Prior Publication Data

US 2012/0068383 A1 Mar. 22, 2012

Related U.S. Application Data

(60) Provisional application No. 61/340,113, filed on Mar. 12, 2010.

(51) Int. Cl.
| | | |
|---|---|---|
| *B29B 13/08* | (2006.01) | |
| *B01J 19/10* | (2006.01) | |
| *B01J 19/06* | (2006.01) | |
| *G10K 11/165* | (2006.01) | |

(52) U.S. Cl.
CPC ............. *B01J 19/10* (2013.01); *B01J 19/06* (2013.01); *B29C 2791/008* (2013.01); *G10K 11/165* (2013.01)

(58) Field of Classification Search
USPC ............. 264/272.15, 275, 442, 443; 209/590; 210/748.05
See application file for complete search history.

(56) References Cited

U.S. PATENT DOCUMENTS

| | | | |
|---|---|---|---|
| 4,179,546 A | | 12/1979 | Garner et al. |
| 4,743,361 A | * | 5/1988 | Schram ............................ 209/1 |
| 4,983,189 A | * | 1/1991 | Peterson et al. .......... 210/748.02 |

(Continued)

FOREIGN PATENT DOCUMENTS

WO    WO 2008127281 A2 * 10/2008

OTHER PUBLICATIONS

International Search Report for PCT/US11/28410, International Searching Authority, Jun. 9, 2011, pp. 1-21.

*Primary Examiner* — Atul P. Khare
(74) *Attorney, Agent, or Firm* — Samuel M. Freund; Cochran Freund & Young LLC

(57) ABSTRACT

Apparatus and methods for using acoustic radiation forces to order particles suspended in a host liquid are described. The particles may range in size from nanometers to millimeters, and may have any shape. The suspension is placed in an acoustic resonator cavity, and acoustical energy is supplied thereto using acoustic transducers. The resulting pattern may be fixed by using a solidifiable host liquid, forming thereby a solid material. Patterns may be quickly generated; typical times ranging from a few seconds to a few minutes. In a one-dimensional arrangement, parallel layers of particles are formed. With two and three dimensional transducer arrangements, more complex particle configurations are possible since different standing-wave patterns may be generated in the resonator. Fabrication of periodic structures, such as metamaterials, having periods tunable by varying the frequency of the acoustic waves, on surfaces or in bulk volume using acoustic radiation forces, provides great flexibility in the creation of new materials. Periodicities may range from millimeters to sub-micron distances, covering a large portion of the range for optical and acoustical metamaterials.

15 Claims, 10 Drawing Sheets

(56) References Cited

U.S. PATENT DOCUMENTS

| | | | |
|---|---|---|---|
| 5,688,464 A * | 11/1997 | Jacobs et al. | 264/401 |
| 5,840,241 A * | 11/1998 | Bishop et al. | 264/437 |
| 6,786,711 B2 * | 9/2004 | Koch et al. | 425/174.2 |
| 8,263,407 B2 * | 9/2012 | Goddard et al. | 436/63 |
| 2002/0185782 A1 | 12/2002 | Koch et al. | |
| 2003/0015035 A1 | 1/2003 | Kaduchak et al. | |
| 2003/0154790 A1 | 8/2003 | Venturelli et al. | |
| 2004/0187714 A1 | 9/2004 | Napadensky et al. | |
| 2008/0245745 A1 | 10/2008 | Ward et al. | |
| 2009/0008567 A1 | 1/2009 | Hyde et al. | |
| 2009/0275465 A1 | 11/2009 | Gang et al. | |

* cited by examiner

1-D

2-D

3-D

MATERIAL FABRICATION USING ACOUSTIC RADIATION FORCES

CROSS-REFERENCE TO RELATED APPLICATIONS

The present application claims the benefit of U.S. Provisional Patent Application No. 61/340,113 for "Acoustically Engineered Materials Using Acoustic Radiation Force" which was filed on Mar. 12, 2010, the entire contents of which is hereby specifically incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF THE INVENTION

Metamaterials are periodic materials having artificially fabricated inclusions in a host medium or on a host surface, that derive their properties, such as mechanical, optical and electrical properties, from the spatial distribution of the inclusions as well as from the properties of the subunits, as opposed to the properties of the components alone. Examples of man-made materials that do not exist in nature include sonic or phononic crystals (periodicity on the millimeter scale) and photonic crystals (periodicity on the sub-micrometer scale). Sonic crystals have a finite-sized periodic array of sonic scatterers embedded in a homogeneous host material and may have spectral gaps, which can be tuned by varying the size and geometry of the material, which prevent the transmission of sound waves having certain frequencies. If the host material is a solid, the term 'phononic crystal' is used for the artificial crystals, and both longitudinal and transverse shear waves may exist and may be coupled with one another. By contrast, for sonic crystals such waves are considered to be independent, and the scatterers are typically solid materials disposed in a fluid. A sonic crystal may be considered to be a sonic version of a photonic crystal, photonic crystals being periodic optical nanostructures having regularly repeating internal regions of high and low dielectric constant which affect the motion of photons in a similar way that periodicity of a semiconductor crystal affects the motion of electrons. Photons may be transmitted through such structures depending on their wavelength. Photonic and phononic effects occur when the spacing of the periodic structures is of the order of the wavelength of the photons or sound waves, respectively.

Photolithography and etching techniques similar to those used for integrated circuits have been used for fabricating three-dimensional photonic crystals. Photonic crystals have also been generated as self-assembled structures from colloidal crystals.

SUMMARY OF THE INVENTION

Embodiments of the present invention overcome the disadvantages and limitations of the prior art by providing apparatuses and methods for creating periodic structures having periodicities from millimeters to sub-micron lengths on surfaces and in three-dimensions.

It is further an object of embodiments of the present invention to provide an apparatus and method for creating such periodic structures in such a manner that acoustical and optical materials can be fabricated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for fabricating materials, hereof, includes: suspending particles in a solidifiable fluid; generating at least one acoustic standing wave having a chosen wavelength in the fluid for a sufficient time that the suspended particles migrate to at least one pressure node of the standing wave or to at least one pressure antinode of the standing wave; and solidifying the fluid.

In another aspect of the present invention and in accordance with its objects and purposes, the apparatus for fabricating materials, hereof, includes: an acoustic resonator cavity for containing a static quantity of a suspension of particles in a solidifiable fluid; means for generating at least one acoustic standing wave having a chosen wavelength in the liquid for a sufficient time that the suspended particles migrate to at least one pressure node or at least one pressure antinode of the at least one standing wave forming a pattern; wherein the fluid is solidified to fix the pattern.

Benefits and advantages of embodiments of the present invention include, but are not limited to, providing apparatus and methods for using acoustic radiation forces to order particles suspended in a host fluid, wherein the particles may range in size from nanometers to millimeters, and may have any shape. The resulting pattern may be may be rapidly generated, typical times ranging from a few seconds to a few minutes, and fixed by using a solidifiable host fluid. Many complex particle arrangements are possible, including acoustic and optical metamaterials having periodic structures ranging from millimeters to sub-micron distances, from an inexpensive, bench-top system.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a graph showing the particle trapping positions, separated by $\lambda_F/2$, where <F>=0 located at the pressure nodes, while

FIG. 3A shows the location of the trapping positions for a positive (+ve) acoustic contrast factor (heavy, hard particles) and those for a negative (−ve) acoustic contrast factor (light, soft, particles), while

FIG. 4A is a schematic representation of an embodiment of a one-dimensional, parallel plate resonator apparatus, while

FIG. 8A is a graph showing an example of the acoustic radiation force for a cylindrical piezoelectric cavity, while

FIG. 10A is a schematic representation of an elastic periodic structure having embedded expandable microspheres, while

DETAILED DESCRIPTION OF THE INVENTION

Figure 1:
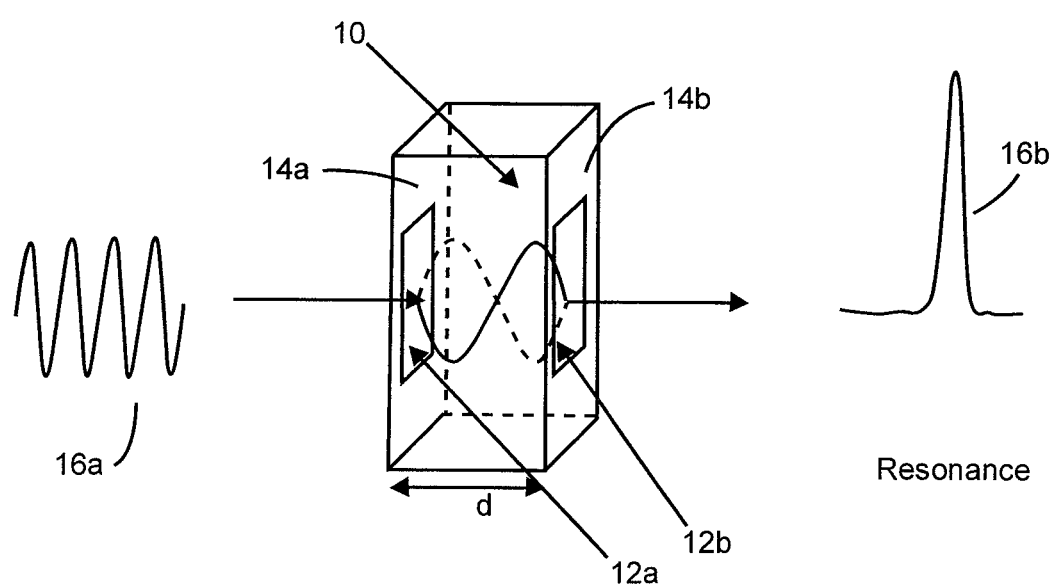
FIG. 1 is a schematic representation of sound transmission through a fluid-filled plane, parallel resonator cavity.

Briefly, embodiments of the present invention include apparatuses and methods for using acoustical standing waves to create layers, or more complex patterns, in chosen materials, wherein selected suspended particles are disposed in a fluid form of the chosen material which may be caused to harden. Transducers disposed on the sides of a container of a chosen static quantity or batch of the suspension are adapted to generate standing waves in the material. The suspended particles are directed to the nodes or antinodes of the standing waves in response to acoustic forces generated therein. After the particles are permitted to gather for a selected period of time, the fluid may be caused to harden, thereby fixing the pattern of suspended particles. The material may then be dissolved, leaving layers of suspended particles.

Embodiments of the invention further include the generation of such materials (periodic structures on surfaces and in one-, two-, and three-dimensions) with periodicities ranging from millimeter to sub-micrometer in length using a variety of host materials and particle compositions, sizes, and shapes, such that the generated metamaterials may be used for both acoustical and optical applications. Out-of-plane resonators suitable for generating such three-dimensional bulk metamaterials, and having large areas will be described.

Acoustic metamaterials may be manually created using large, millimeter-size objects; that is, for audio applications, the wavelength of sound in air is large and larger structures are needed. For the ultrasonic frequency range, wavelengths range between the micrometer and millimeter scales. Ultrasonic frequencies are used in medical applications and for nondestructive testing, as examples. Sonic crystals may be used to create superlenses, which will allow imaging with sub-wavelength resolution that are not otherwise possible with other lens materials. However, such small periodic structures are not readily generated by hand.

As stated hereinabove, photonic crystals may be fabricated in a planar fashion using photolithography, electron-beam lithography and other etching techniques similar to those used for fabricating integrated circuits, and quasi-three-dimensional metamaterials are achievable using layer-by-layer processing. Among the challenges in the fabrication of these structures is obtaining sufficient precision to prevent scattering losses from blurring the crystal properties; forming deep channels with sufficiently vertical walls; limitations in the choice of slab materials that can be anisotropically etched to form channels; physical limitations of such slab materials that, in turn, can impose limitations on modulation schemes that might be realized; limited tunability of parameters during and after the fabrication process; and, more generally, material cost, device yields, fabrication cost, and design flexibility. Other difficulties would be apparent to one skilled in the art upon reading the present disclosure.

Reference will now be made in detail to the present embodiments of the invention, examples of which are illustrated in the accompanying drawings. In the FIGURES, similar structure will be identified using identical reference characters. Turning now to FIG. 1, sound transmission through fluid-filled resonator cavity, 10, is illustrated. Flat transducers (piezoelectric crystals, as examples), 12a, and 12b, are attached to opposing sides, 14a, and 14b, of resonator cavity 10, which may be a fluid container having parallel walls, such as a cuvette. Transducer 12a is excited by sine wave transmitter voltage signal, 16a, effective for generating sound waves in the fluid, and the amplitude, 16b, of the signal generated in opposing receiving transducer 12b is observed as an electrical signal converted by receiving transducer 12b. When an integral number of half wavelengths ($\lambda/2$) of the sound wave in the fluid exactly span the spacing, d, of parallel walls 14a, 14b of cuvette 10, one may observe standing waves in the fluid between the two opposite walls of the cuvette, and the sound transmission as a function of frequency, reaches a maximum (resonance peak, shown as output 16b). A series of such resonance peaks may be observed if the excitation frequency is varied over a frequency range that satisfies the condition for the standing wave.

The sound speed of the wall material is generally higher than that for the fluid inside the resonator cavity. If the frequency is varied over a wide range, one observes a series of resonances where the sound transmission peaks. At some frequencies, standing waves are generated in the vessel wall; therefore, the observed resonance pattern is a combination of the resonance spectrum of the wall and that of the fluid. At frequencies where there are resonance peaks, a series of nodes and antinodes are established inside the resonator cavity. The spacing of the nodes and antinodes depends on the frequency of the excitation signal.

The acoustic radiation force is interpreted as the time-averaged force acting on an object in a sound field. This force is caused by a change in the energy density of an incident acoustic field. Thus, an object in the wave path that absorbs or reflects sound energy is subjected to the acoustic radiation force. Small compressible spheres suspended in a standing acoustic wave field (for example, the standing wave set up in a fluid inside a resonator cavity) experience a radiation force which has three separate components:

Primary acoustic force, $F_{ac}$, which moves the spheres into the node or anti-node planes of the acoustic displacement velocity;

Hydrodynamic Drag, $F_d$, which affects the particles as they move through the liquid under the influence of the acoustic forces; and Secondary acoustic force, $F_s$, (Bjerknes Force) caused by the scattered sonic field of a sphere, which causes nearby particles to coagulate.

The primary acoustic forces in acoustic standing wave field can be expressed as follows:

$$F_{ac} = \left[\frac{P_0^2 V_P \beta_m}{2\lambda_m}\right] \varphi(\beta, \rho) \sin\left(\frac{4\pi z}{\lambda_m}\right),$$

where $$\varphi(\beta, \rho) = \left(\frac{5\rho_p - 2\rho_m}{2\rho_p + \rho_m} - \frac{\beta_p}{\beta_m}\right),$$

$V_p$=particle volume; $\beta$=compressibility; $\rho$=density; $\lambda$=wavelength of sound; $P_0$=Peak acoustic pressure; z=distance from pressure node; and m, p=medium, particle (subscripts).

Figure 2A:
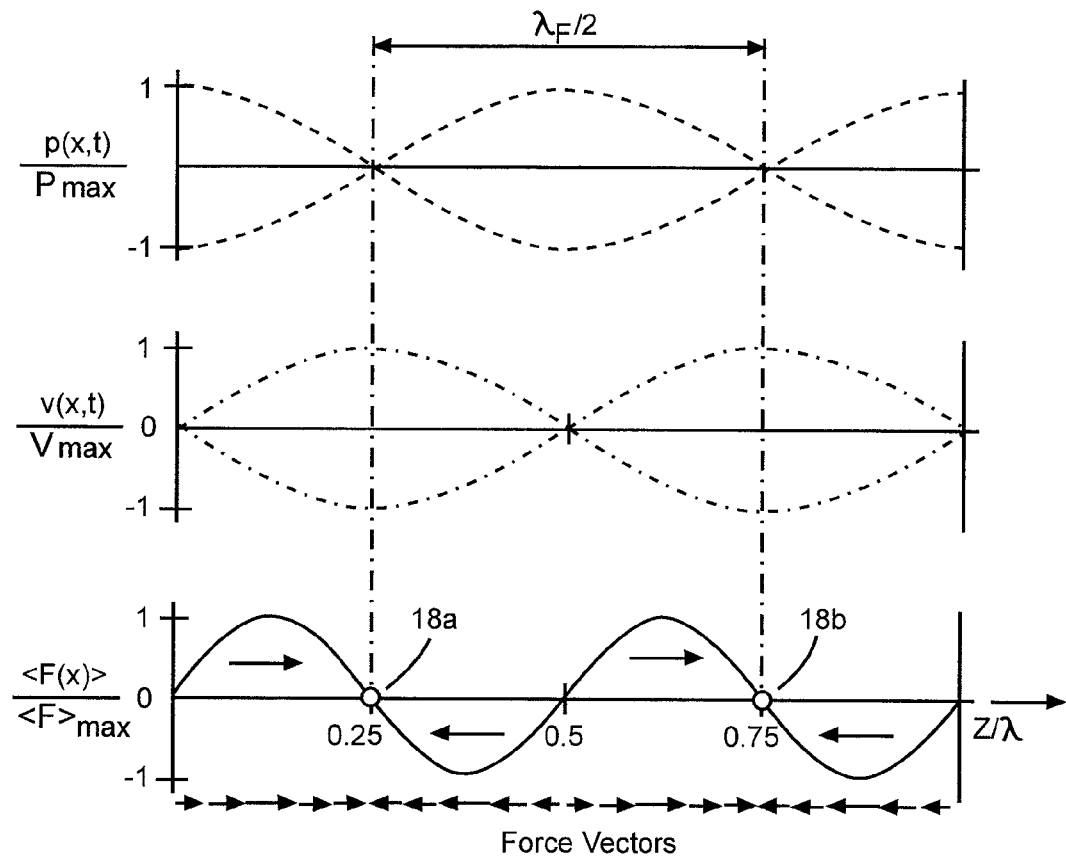
Figure 2B:
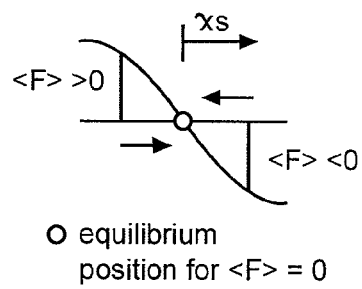
FIG. 2B is a graph of the direction of the force where <F>≠0 and <F> has a negative slope, both for a plane parallel resonator.

If a particle having a size much smaller than the wavelength of sound in the liquid is placed inside a resonator cavity where standing waves have been excited, it experiences a radiation force F that pushes the particle to either the pressure node or anti-node depending on the acoustic contrast factor, φ, where the particle is trapped. The trapping positions, 18a, and 18b, separated by λ/2 (FIG. 2A), are found where <F>=0 and where <F> has a negative slope for <F>≠0 as shown in FIG. 2B, hereof, for a plane parallel resonator. FIG. 2A further shows the relationship between the trapping locations and the pressure nodes and acoustic-wave velocity antinodes, respectively, for particles having positive φ.

Figure 3A:
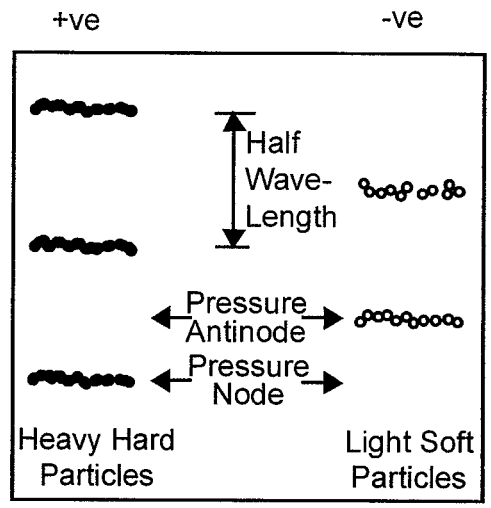
Figure 3B:
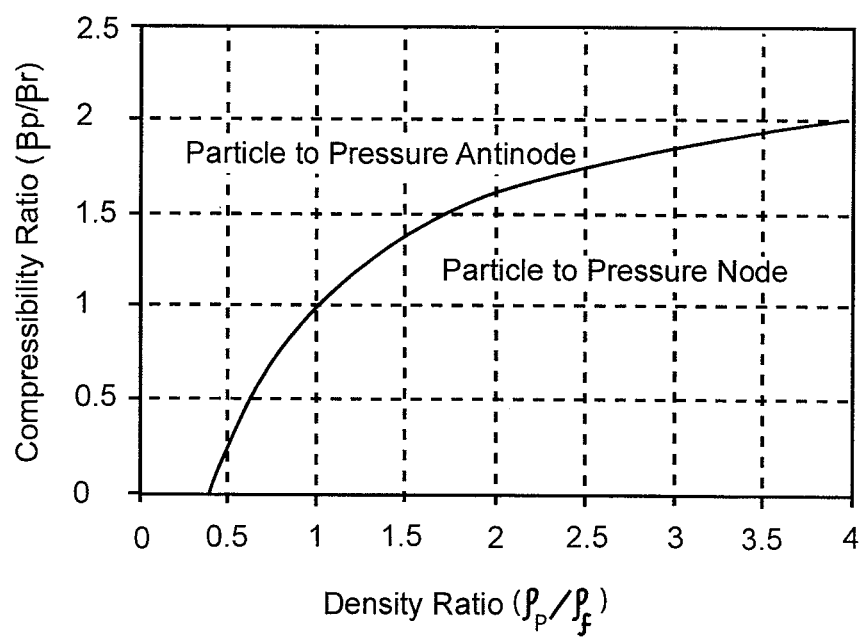
FIG. 3B is a graph of the acoustic contrast factor as a function of the density and compressibility ratio.

If φ (the acoustic contrast factor) is positive (+ve), the particles move to the velocity antinodes, while if φ is negative (−ve), the particles collect at the velocity nodes, as shown in FIGS. 3A and 3B.

As the particles move through the liquid under the influence of the acoustic forces mentioned hereinabove, they experience hydrodynamic drag which is given by the drag force $$F_d = -4\pi \left[\frac{1 + 2\hat{\mu}/3}{1 + \hat{\mu}}\right] \mu Rc,$$

where μ is the viscosity of the fluid, $\hat{\mu}$ is the ratio of viscosity of the drop to the continuous phase and c is the speed of the drop. When the particles move closer to the pressure antinodes and within a few diameters of another particle, a secondary radiation attractive force between two spheres in an acoustic field dominates. These inter-particle forces drive the particles together.

$$F_s = -\frac{k^2 E_{ac}}{2\pi} \left[1 - \frac{\beta_p}{\beta_f}\right]^2 \frac{V_1 V_2}{d^2},$$

where, $V_1$ and $V_2$ are the volumes of the interacting droplets, and d is the separation distance between the centers of the particles.

If there is an ensemble of particles of a given acoustic contrast factor, these particles form a series of parallel planes, where they tightly bunch up due to the secondary force (the Bjerknes force). In the case of droplets, coagulation takes place forming larger droplets.

Figure 4A:
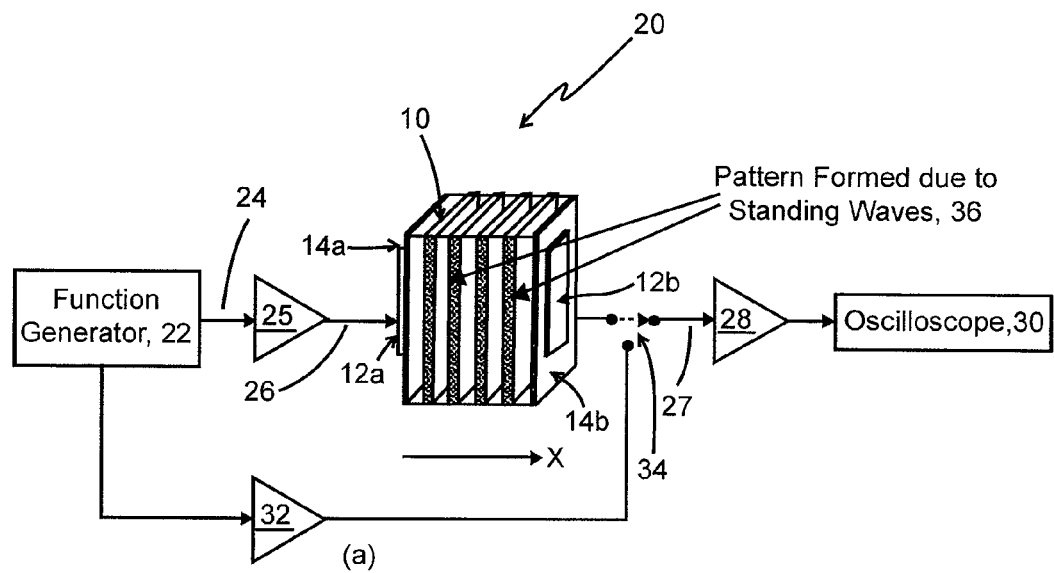

A schematic representation of an embodiment of a one-dimensional, parallel plate resonator apparatus, 20, is shown in FIG. 4A. Digital waveform generator, 22, may generate a fixed-frequency sine wave, 24; other waveforms, such as a triangular waveform, a square wave, as examples, may be effectively used. Sine wave signal 24 is directed into amplifier, 25, although amplification may not be required, and output, 26, is applied to transmitter transducer 12a attached to flat plate 14a of glass cuvette 10 having square or rectangular geometry, and cross-sectional dimensions 2 cm×2 cm. The transmitter used was a broadband 5 MHz, center-frequency transducer having 2 cm diameter. Receiving transducer 12b attached to opposing wall 14b was identical to transmitting transducer 12a. The precise transducer employed depends on the periodicity of the standing wave pattern required; higher frequencies being used for smaller spacings (periodicities). The transducers may be piezoelectric crystal plates or discs. Output signal, 27, from receiving transducer 12b was directed into amplifier, 28, and observed on oscilloscope, 30. The excitation frequency 24 is varied until a maximum transmission signal was achieved. There are many such peak transmission frequencies (resonances), and one may chose a particular frequency to obtain a desired standing wave pattern spacing. A frequency spectrum may be obtained by sweeping the waveform generator, observing the transmission spectrum and recording the resonance peak frequencies. The strongest transmission signal is obtained in the neighborhood of a maximum in the wall resonance; the transducer center frequency may be chosen to match the peak of the wall resonance. However, other resonance peak frequencies may be chosen. Matching the frequencies is useful for reducing heating of the fluid (for example, an epoxy). The excitation voltage level may then be adjusted to efficiently drive the migration of the particles without significantly heating the fluid. Typically, the excitation may be increased by an order of magnitude to ≥10 V.

To produce sonic crystals, phononic crystals or acoustic metamaterials (where the particles are arranged in a periodic array of small resonators) that are permanent (that is, where a 3-dimensional periodic pattern is maintained after the sonic field (and the resultant acoustic radiation force) is withdrawn, the pattern must be fixed in an appropriate matrix. Further, the suspension is kept in a static condition during the formation of the pattern in order to reduce blurring of the patterns. To achieve this result, periodic patterns may be captured in an epoxy, with the sonic field impressed on the system as the epoxy solidifies (cures), leaving a permanent pattern after the sonic field is withdrawn. A UV-curable epoxy or an appropriate sol-gel host system that solidifies with time may be used for more rapid curing.

One may also apply the same excitation signal to receiving transducer 12b through amplifier, 32, and switch, 34, to obtain excitation from opposite sides of the cuvette instead of relying on the reflected sound to create the standing wave pattern. Depending on the impedances of the fluid and the walls of the cuvette, one may invert the excitation signal that is applied to the receiving transducer. One can also use opposing transducers, where both the phase and the frequency of the two transducers can be varied to create additional patterns. Use of a parallel plate cuvette for containing the fluid-particle mixture was provided as an example; the cuvette may be replaced by a resonator cavity having piezoelectric plates as sides.

The wavelengths of THz electromagnetic waves in air or any medium are similar to the wavelengths of ultrasonic waves in the MHz range for any fluids or epoxies, as examples. Therefore, the same technique can be used for both optical metamaterials and acoustic metamaterials. Optical metamaterials affect electromagnetic wave propagation, whereas acoustic metamaterials affect elastic wave propagation. For optical metamaterials, negative refractive indices are observed, whereas the analogous parameters for acoustic metamaterials are negative bulk modulus and negative density. Embodiments of the present invention can thus create phononic or photonic crystals, which are periodic structures having periodicities on the order of wavelength, and wave diffraction and interference become relevant. The wavelengths referred to are the wavelengths of ultrasound or light used for the device application, and not the wavelengths used in the creation of the pattern.

If a transparent cuvette is used, particle movement toward the various nodes (or antinodes depending on the acoustic contrast factor of the particles) may be observed. If the viscosity of the fluid is sufficiently low, a pattern consisting of a series of parallel planes (reference character 36 in FIG. 4A) parallel to the parallel walls of cuvette 10 is generally formed in between 10 s and 5 min. For self-reacting epoxies (resin plus hardener), once the pattern is generated, the excitation signal is slowly lowered to zero while the epoxy is allowed to cure. If UV-curable epoxy is used, the pattern is solidified by directing UV light into the cuvette, after which the excitation signal is turned off. Typically, the pattern-containing epoxy block shrinks a small amount on all sides, making it straightforward to remove the solidified block from the cuvette.

Although commercially available epoxies have been employed to fix or solidify the patterns, the patterns may also be solidified in other polymerizable monomers or short chain polymers, and by using sol-gel processing. Soft rubber as a host fluid has also been used to create a pressure-tunable periodic structure (EXAMPLE 2, hereinbelow). Therefore, the embodiments of the present invention are not limited to epoxies, and appropriate host fluids that can be solidified by chemical reaction, applied heat or light, or any other external stimulation may be used. The appropriateness of the fluid relates in part to its acoustic absorption; that is, the absorption is such that the patterns can be created having a desired spacing. For example, to create a pattern having sub-micron periodicity, host fluids transparent to sound up to 20 MHz are advantageous.

If the particle loading is large, cavity resonances tend to slightly shift as the pattern is formed. This, in turn, lowers the radiation force and the pattern formation rate is slightly reduced. A phase-locked loop feedback controller (Not shown in FIG. 4A) may be included such that the phase of the received output signal is compared with the phase of the excitation signal to the transmitter and the applied frequency varied to maintain this phase difference (at zero or 90 degrees, for example) at a constant value. Such an electronic phase-locked system provides automatic control and may be used to correct for other system changes such as those caused by temperature variation or concentration variation as the pattern is formed. Clearly, there are many ways to implement such system controls.

Figure 4B:
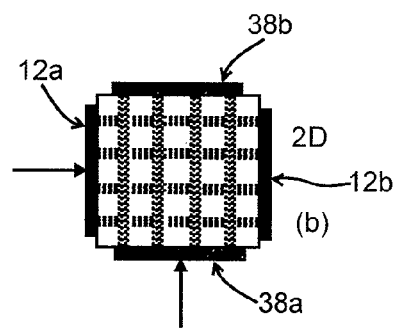
FIG. 4B shows an arrangement of acoustic transducers for an embodiment of a two-dimensional parallel-plate resonator apparatus.
Figure 5A:
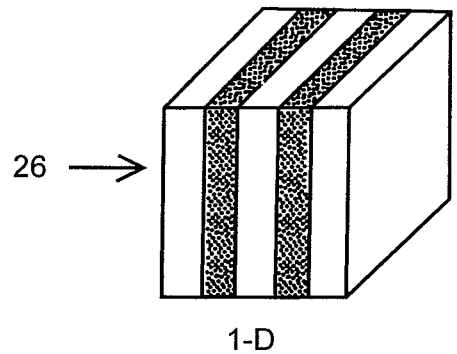
FIGS. 5A-5C are representative particle patterns for one-dimensional, two-dimensional and three-dimensional application of orthogonal acoustic waves to a container of particles suspended in a host fluid, respectively.
Figure 5B:
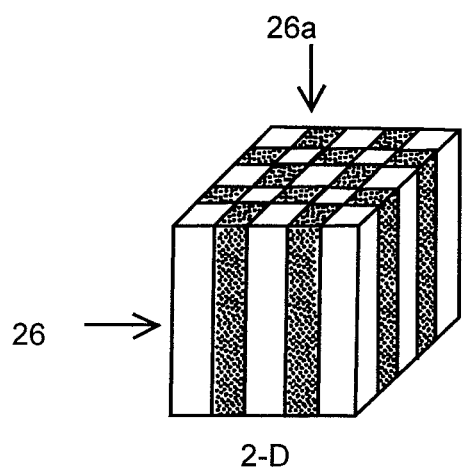
Figure 5C:
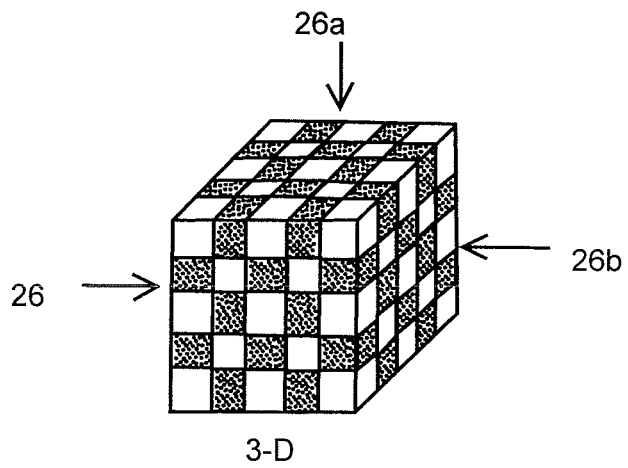

FIG. 4B illustrates a two-dimensional apparatus for the transmitting and receiving transducers, 12a and 38a, and 12b and 38b, respectively. The pattern 36 of vertical parallel planes of particles in suspension as shown in FIG. 4A, are considered to fall in the one-dimensional category (FIG. 5A) because two opposing parallel plate transducers were used with a cuvette having a square cross-section. When orthogonal sound fields are applied such that two intersecting sound field patterns are generated, two-dimensional patterns may be produced (FIGS. 4B and 5B). The periodicity of the patterns in the orthogonal directions may be different, thereby producing two standing wave patterns (frequencies), unless the same periodicity is required in both orthogonal directions. Moreover, the container may have other than rectangular cross-section. To produce a three-dimensional pattern, such as that shown in FIG. 5C, sound fields are generated in three orthogonal directions. As an example, a cube-shaped cuvette having an open top and a cap fitting the opening having an attached transducer might be employed. Once the particle-fluid mixture is introduced into the cuvette, the cap would be attached, forming thereby a cube having transducers attached to the three orthogonal sides. In this situation, normally curing epoxy would be used since it would be more difficult to introduce light into the system, as opposed to the visual access to the particle pattern available for a one-dimensional system. For low concentrations of particles, the particles tend to collect at the acoustic wave intersections.

Figure 6:
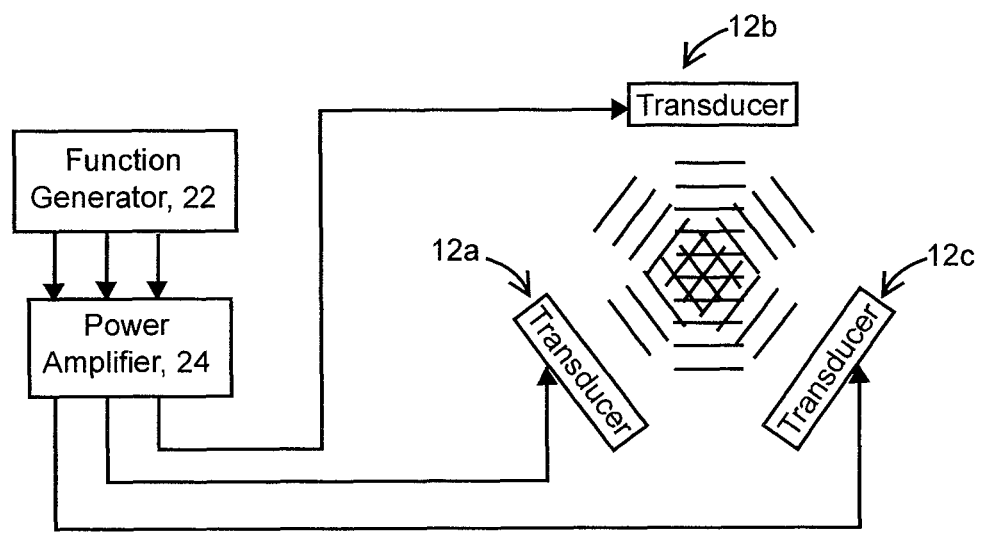
FIG. 6 is a schematic representation of transducers disposed in a non-orthogonal configuration.

FIG. 6 is a schematic representation of transducers 12a-12c disposed in a non-orthogonal configuration.

Patterns may be generated using amplitude-modulated signals to generate standing waves. In this situation, a high-frequency sound wave is used as the carrier frequency that generates a pattern in the resonator cavity. A lower frequency is used to modulate this carrier frequency such that a coarser standing wave pattern is also impressed on the fluid of interest. As an example, the carrier might produce 50 planes of concentrated particles, whereas the modulating frequency generates 5 planes. One observes a pattern that comprises several planes located around the 5 planes with the central planes having disappeared.

If two kinds of particles having positive (+ve) and negative (−ve) acoustic contrast factors (FIGS. 3A and 3B), a periodic pattern alternating in the type of particle will result, wherein one type particle concentrates at the nodes, and the other particles concentrate at the antinodes. Further, if one mixes particles of the same kind but having different sizes, then the generated pattern will have the larger particles in the center and the smaller particles on the outside, useful for applications such as the fabrication of light guides. A combination of these embodiments may provide a large number of complex patterns that are not possible to generate using traditional lithography methods. Additionally, lithographic techniques are generally applied to a small class of materials such as silicon, as an example, that are used in electronic integrated circuits, and cannot be used for arbitrary particles. By contrast, the acoustic radiation force is applicable to any type of particle, and patterns of particles may be created using superconducting, dielectric, magnetic, piezoelectric, semiconducting, and metallic particles, and hollow microspheres, as examples, in a variety of host materials. This is not possible with another techniques, including the self-assembly techniques.

Figure 7:
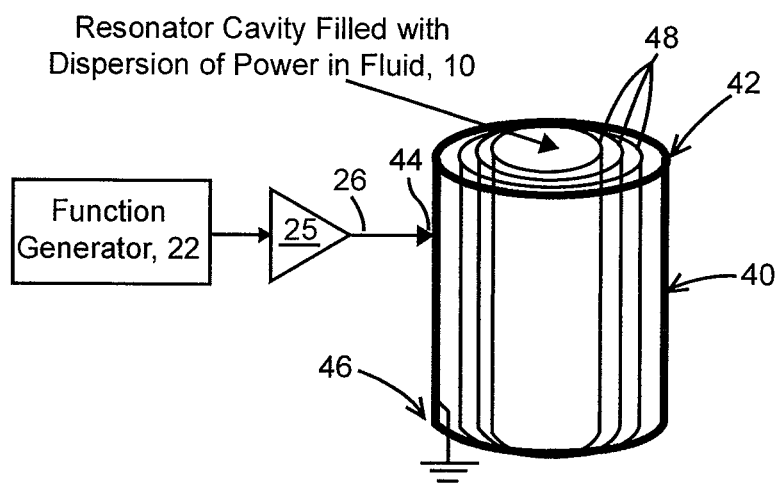
FIG. 7 is a schematic representation of an embodiment of a cylindrical acoustic resonator apparatus, illustrating the concentration of particles in periodic cylindrical patterns.

Embodiments of the present invention may be utilized for generating periodic structures which conform to the standing wave pattern of any resonator system. For example, particles may be concentrated in periodic cylindrical patterns when a cylindrical resonator is employed, as shown in FIG. 7. Commercially available, 1.5 cm diameter, hollow cylindrical piezoelectric element, 40, is filled with a suspension of particles in a liquid, and electrically excited at the thickness resonance mode of the cylinder wall, 42, by electrodes, 44, outside of the wall, and 46, inside the wall, such that sound waves are generated (~1.5 MHz) and develop a standing wave pattern at the appropriate frequency. The number of concentric cylinders formed depends on the frequency. An impedance analyzer was first used to determine the resonance spectrum of this fluid-filled hollow cylinder, and the frequencies of interest were recorded. The cylinder was then closed at the bottom end by adhesive tape, and the particle-epoxy mixture was introduced. A sine wave was applied by waveform generator 22 to the outer and inner electrodes on the piezoelectric-cylinder and the excitation signal was increased.

Acoustic radiation forces move the particles to pressure nodes, 48, inside the cylinder. The particles were observed to concentrate as concentric cylinders in a 3-dimensional pattern, in a similar manner to patterns for orthogonal geometry.

Figure 8A:
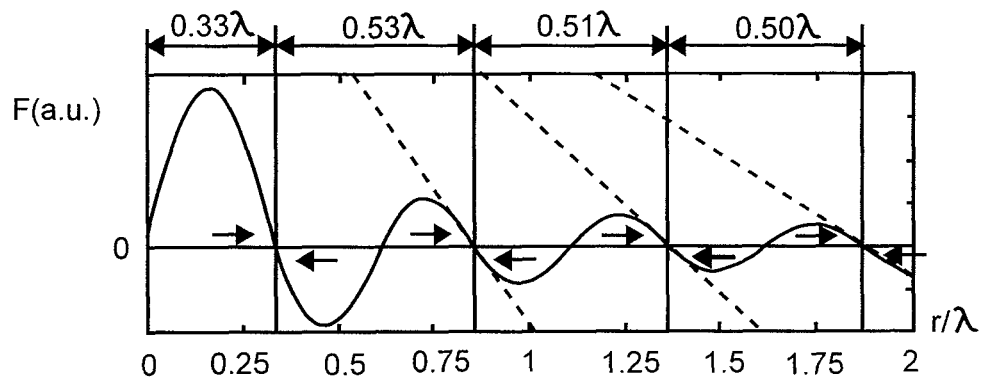

The acoustic radiation forces for the cylindrical geometry are shown in FIG. 8A. Clearly, a large number of structures may be generated in accordance with embodiments of the present invention by choosing the appropriate resonator structure.

Figure 8B:
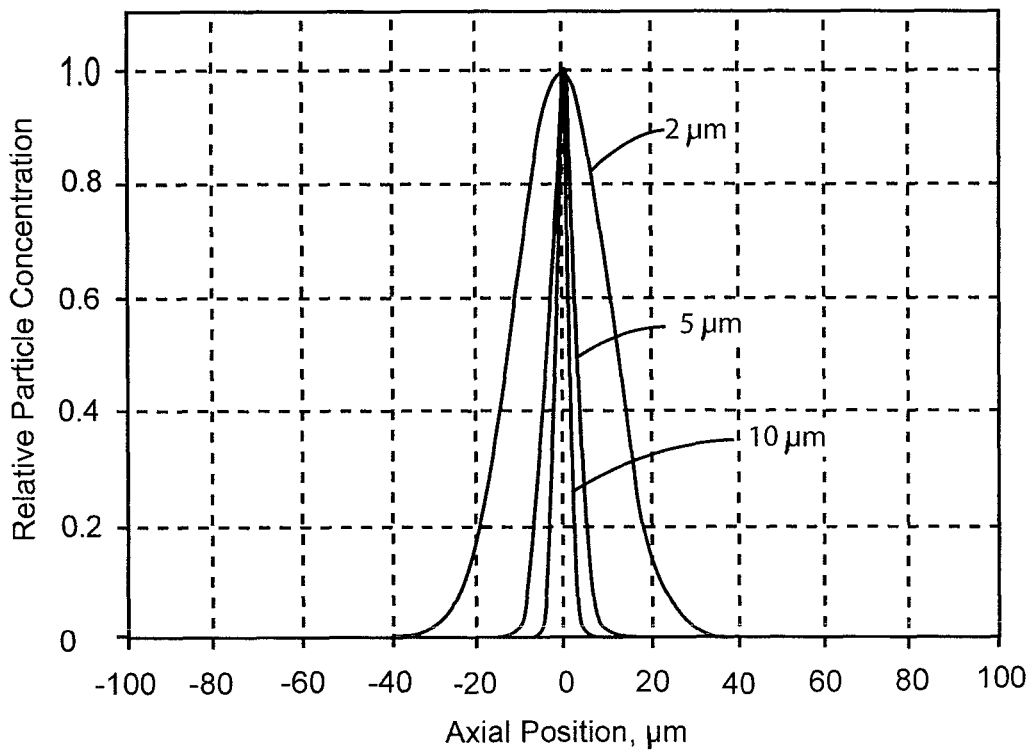
FIG. 8B is a graph showing the concentration profile for particles not having a uniform size distribution in a liquid suspension, wherein particles having larger diameters will move to the center with smaller particles progressively removed from the center.

When particles are concentrated at the standing wave pressure nodes or antinodes, depending on the acoustic contrast factor of the particle-host system, different sized particles experience different levels of force. If the particles in a liquid suspension do not have a uniform size distribution, a concentration profile shown FIG. 8B results, wherein particles having the largest diameter will move to the center with smaller particles progressively removed from the center.

Figure 9:
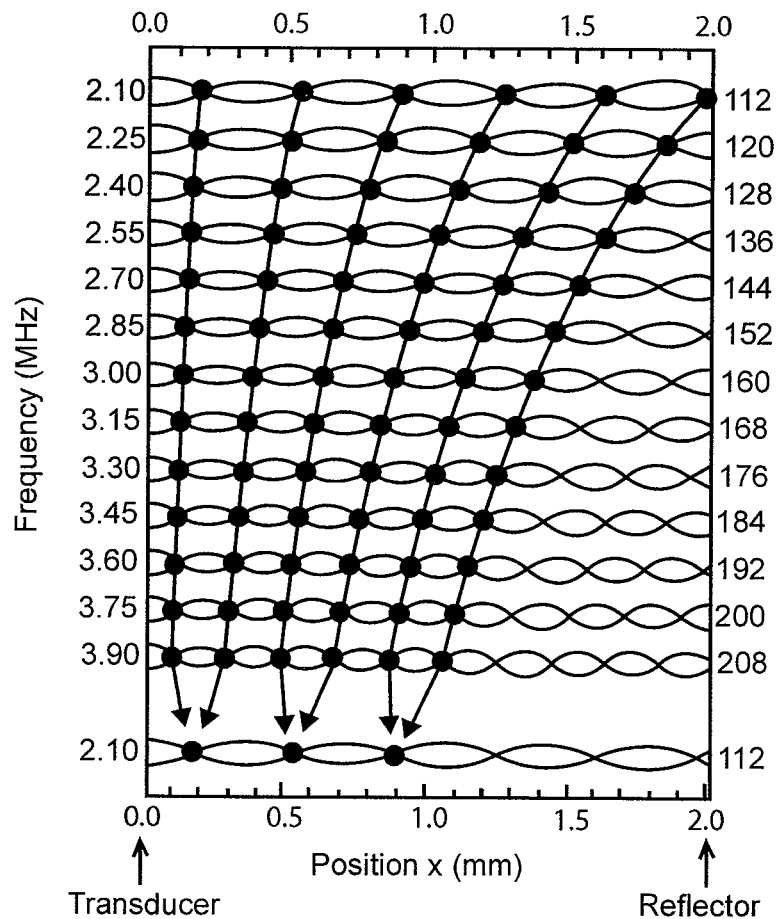
FIG. 9 is a graph illustrating that acoustic forces may be generated using two-frequency mixing with the generation of beat frequencies in place of a single applied resonant acoustic frequency.

FIG. 9 is a graph illustrating that acoustic forces may be generated using two-frequency mixing with the generation of beat frequencies instead of using standing waves at a single applied acoustic frequency.

Having generally described embodiments of the present invention, the following examples provide additional details.

EXAMPLE 1

Particles having sizes varying from 5 nm diamond particles to 100 μm carbon particles have been employed. The particles may have any shape, including spherical (10 μm polystyrene spheres were used). Particles were suspended in 5-minute epoxy (for example, Devcon S-208), or UV-curable epoxy, and placed in cuvette 10 (FIG. 4A). The suspension was stirred using a syringe to generate a homogenous mixture while the epoxy was unhardened. During this stirring and mixing, the ultrasonic signal was not applied to the cuvette. After mixing, and after the frequency corresponding to a resonance peak was determined, as described hereinabove, the excitation signal was increased by an order of magnitude (typically, ≥10 V), and a pattern of parallel concentrations of particles was generated.

EXAMPLE 2

Figure 10A:
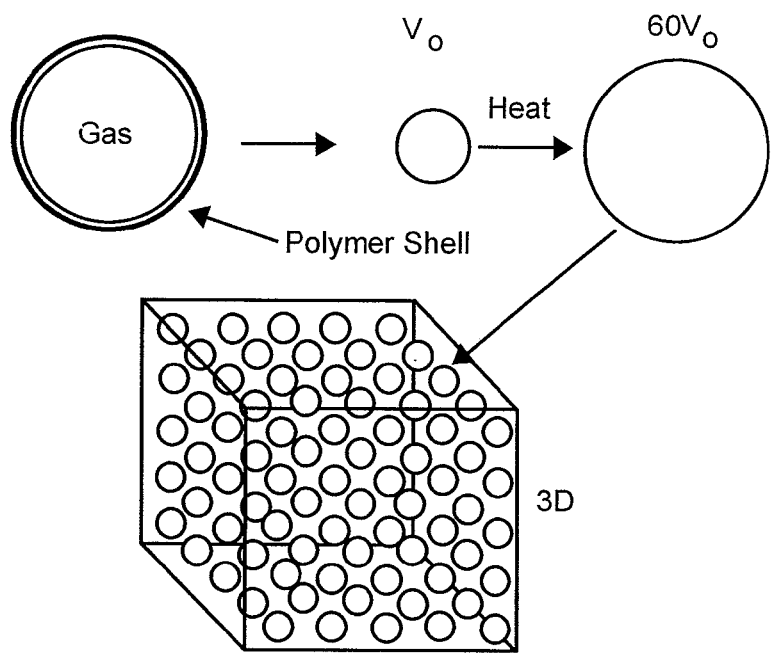
Figure 10B:
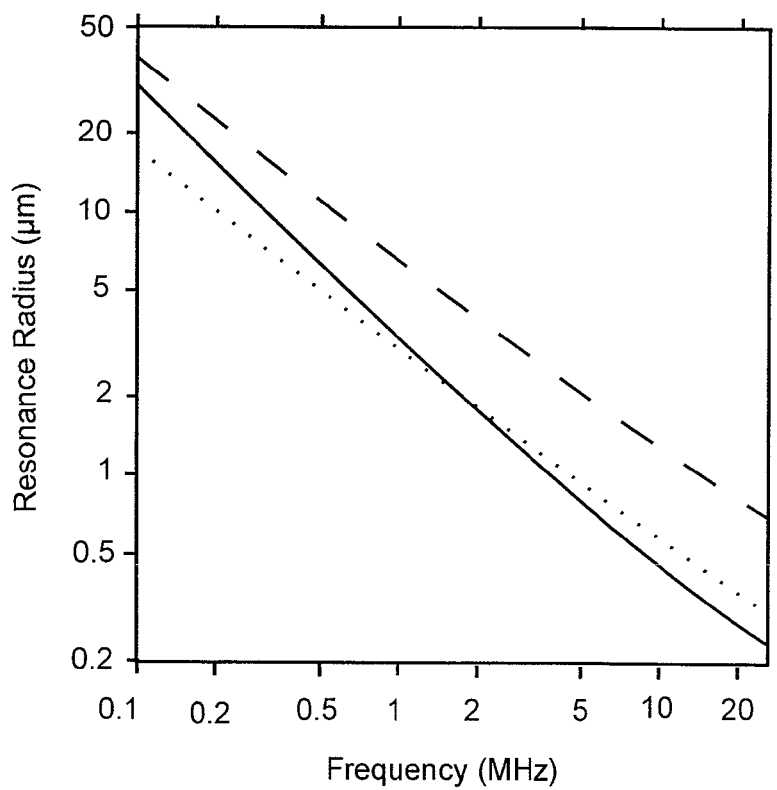
FIG. 10B is a graph illustrating the resonant frequency of such expandable microspheres as a function of sphere radius.

Gas-filled microspheres (Expancel®, vinylidene chloride, acrylonitrile, or methyl methacrylate, as examples) available in initial diameter ranges between 6 μm and 40 μm, expand by factor of 60 by heating (FIG. 10A). Microspheres are filled with a chosen gas (isobutane or isopentane, as examples). Elastic (soft rubber, as an example) periodic structures generated in accordance with the teachings of the present invention behave as tunable micro-resonator system (acoustic metamaterial). FIG. 10B shows a graph of resonance frequency as a function of the microsphere radius which may be altered by heating the 3-dimensional structure.

Local microresonators may also be generated is the mass-spring system where one can use a heavy particle coated with softer polymer material. The periodicity and size of the micro-resonators are less than $\frac{1}{6}^{th}$ the wavelength that will be used for its use. Since the wavelength is much larger than the periodicity or the size of the resonators, the medium behaves as an effective medium with negative properties.

EXAMPLE 3

If the particles are in the form of cylinders, then acoustic radiation forces apply a torque to these cylinders, which align the cylinders parallel to each other. This effect was demonstrated using a mixture of 80 μm carbon fibers in epoxy and then solidified. A slice of the solidified block was observed under a scanning electron microscope (SEM) showed the parallel alignment of the carbon fibers. The method is applicable to nanowires and nanotubes. Additionally, such structures, if generated in a gel (for example, agar) or a bio-growth medium, may be useful as a scaffolding for growing tissues and other biological materials.

In summary, embodiments of the present fabrication invention create periodic structures in one-, two-, and three-dimensions, quickly and inexpensively using bench-top instrumentation since acoustic radiation forces do not discriminate among materials. The forces depend only on the density and compressibility of a particle and not its material properties. As a result, many particle types may be used, including, but not limited to metals; non-metals (insulators, non-conducting polymers, etc.); dielectrics; piezoelectric materials; paramagnetic materials; semiconductors; superconductors; nanotubes and nanowires; fibers; hollow or filled microspheres or tubes; and biological materials.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of fabricating a material, the method comprising steps of:
    suspending particles in a solidifiable fluid within a resonator cavity having at least one surface spaced from an opposing reflecting surface, at least some of the suspended particles having a non-uniform size distribution;
    generating at least one acoustic standing wave in the fluid at a chosen wavelength, each standing wave reflecting from a corresponding reflecting surface to form spaced pressure nodes and antinodes trapping the suspended particles with a concentration profile progressively increasing in particle size toward a corresponding node or antinode center; and
    solidifying the fluid so as to form the material to have the concentration profile of particles fixed in place.

2. The method of claim 1, wherein the wavelength, λ, of the standing wave is selected such that a chosen number of pressure nodes and a selected number of antinodes are generated.

3. The method of claim 2, wherein the pressure nodes are spaced apart by λ/2, and the antinodes are spaced apart by λ/2.

4. The method of claim 1, wherein the at least one acoustic standing wave is generated in greater than one dimension.

5. The method of claim 1, wherein each acoustic standing wave is generated using an acoustic transducer in contact with a corresponding at least one surface.

6. The method of claim 1, wherein the particles are elongated, and wherein the elongated particles are oriented by the at least one acoustic standing wave.

7. The method of claim 1, wherein the particles comprise hollow microspheres.

8. The method of claim 7, wherein the hollow microspheres are expandable gas-filled microspheres, and wherein the solidified fluid is elastic.

9. The method of claim 1, wherein the particles comprise particles having more than one composition.

10. The method of claim 9, wherein the particles comprise particles having positive acoustic contrast factors and particles having negative acoustic contrast factors.

11. The method of claim 1, wherein the at least one standing wave is generated using amplitude-modulated acoustic signals.

12. The method of claim 1, wherein the material comprises a phononic metamaterial.

13. The method of claim 1, wherein the material comprises a photonic metamaterial.

14. The method of claim 1, wherein the fluid comprises at least one epoxy.

15. The method of claim 1 further comprising removing the material from the resonator cavity.

* * * * *